Figure 5:
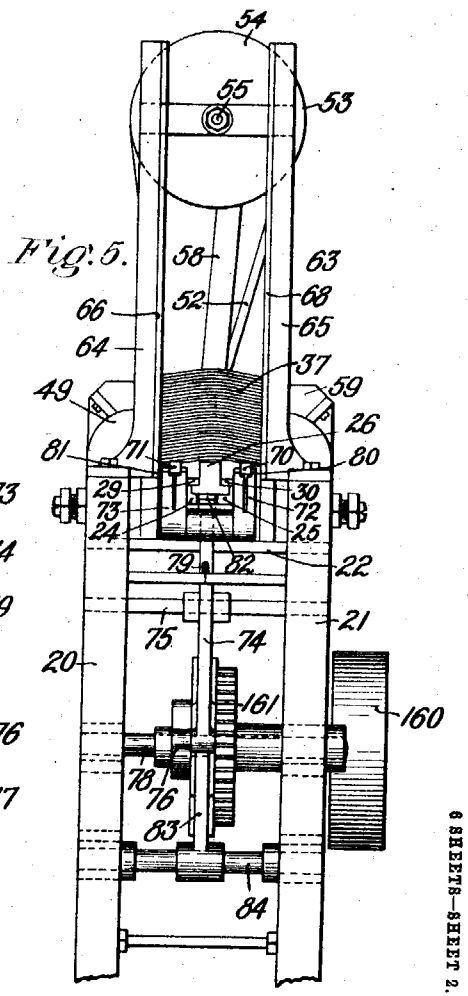

B. B. WATERMAN.
MACHINE FOR TACKING SHOE SHANKS.
APPLICATION FILED MAR. 26, 1908.
12,870. Reissued Oct. 27, 1908.
6 SHEETS—SHEET 1.
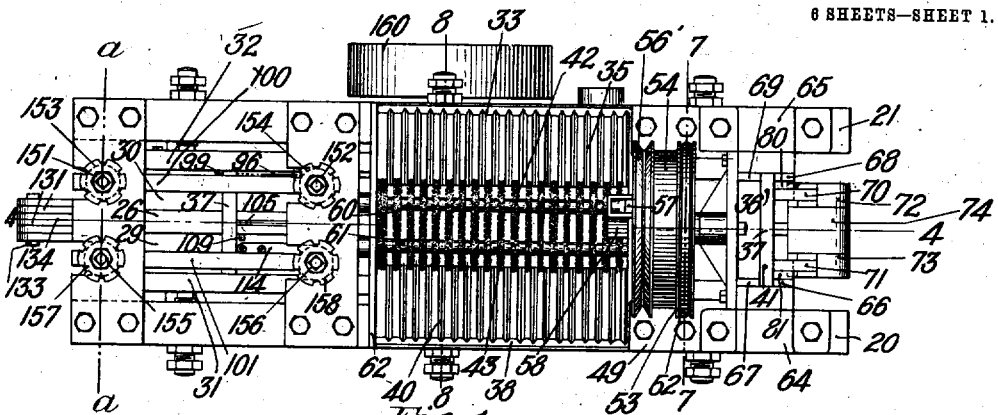
Fig. 1.
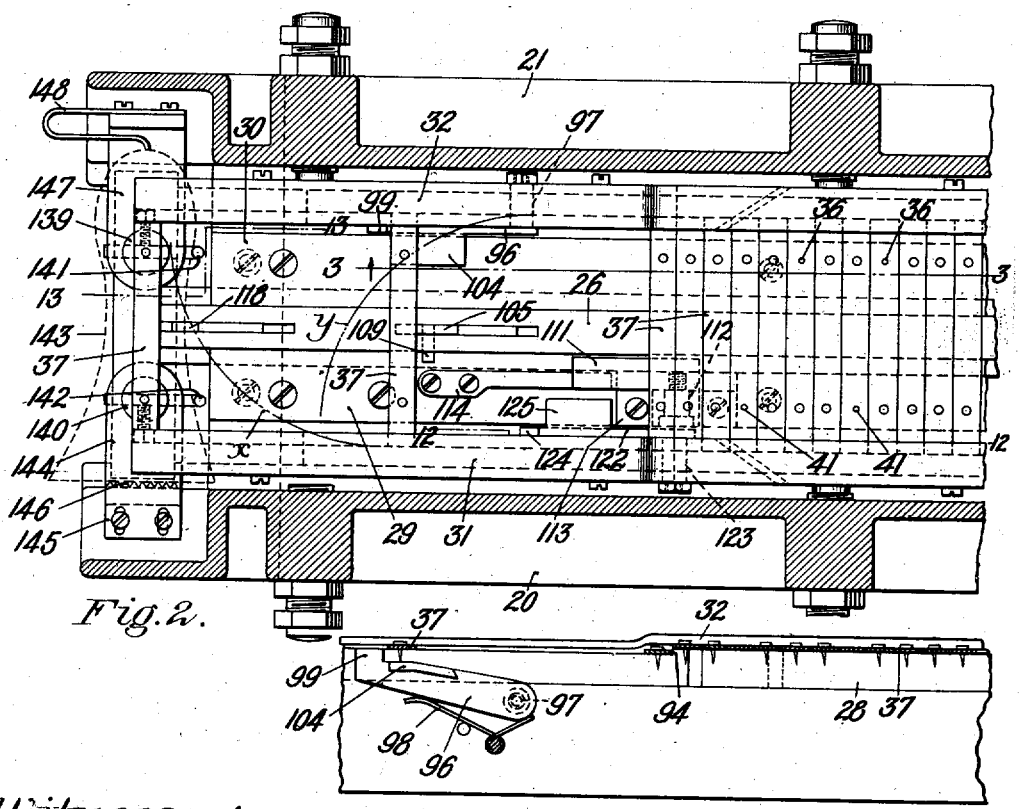
Fig. 2.
Fig. 3.
Witnesses:
Ernest A. Telfer
Lucius B. Weymouth.
Inventor:
Bradford B. Waterman,
by his attorney, Charles S. Fooding.
THE NORRIS PETERS CO., WASHINGTON, D. C.

B. B. WATERMAN.

MACHINE FOR TACKING SHOE SHANKS.

APPLICATION FILED MAR. 26, 1908.

12,870.

Reissued Oct. 27, 1908.

6 SHEETS—SHEET 2.

Witnesses:

Ernest A. Telfer

Lucius B. Weymouth

Inventor:

Bradford B. Waterman by his attorney, Charles N. Fordering.

THE NORRIS PETERS CO., WASHINGTON, D. C.

B. B. WATERMAN.

MACHINE FOR TACKING SHOE SHANKS.

APPLICATION FILED MAR. 26, 1908.

12,870. Reissued Oct. 27, 1908.

6 SHEETS—SHEET 3.

Witnesses:
Ernest A. Tebbe
Lucius B. Weymouth

Inventor:
Bradford B. Waterman
by his attorney, Charles S. Fowling

THE NORRIS PETERS CO., WASHINGTON, D. C.

B. B. WATERMAN.

MACHINE FOR TACKING SHOE SHANKS.

APPLICATION FILED MAR. 26, 1908.

12,870. Reissued Oct. 27, 1908.

6 SHEETS—SHEET 4.

*Witnesses:*

Ernest A. Telfer

Louis B. Weymouth

*Inventor:*

Bradford B. Waterman, by his attorney Charles V. Fowling.

THE NORRIS PETERS CO., WASHINGTON, D. C.

B. B. WATERMAN.

MACHINE FOR TACKING SHOE SHANKS.

APPLICATION FILED MAR. 26, 1908.

12,870. Reissued Oct. 27, 1908.

6 SHEETS—SHEET 5.

Witnesses:
Ernest A. Tiffe
Lucius B. Weymouth.

Inventor:
Bradford B. Waterman
by his attorney, Charles S. Fooding.

THE NORRIS PETERS CO., WASHINGTON, D. C.

B. B. WATERMAN.
MACHINE FOR TACKING SHOE SHANKS.
APPLICATION FILED MAR. 26, 1908.
12,870. Reissued Oct. 27, 1908.
6 SHEETS—SHEET 6.
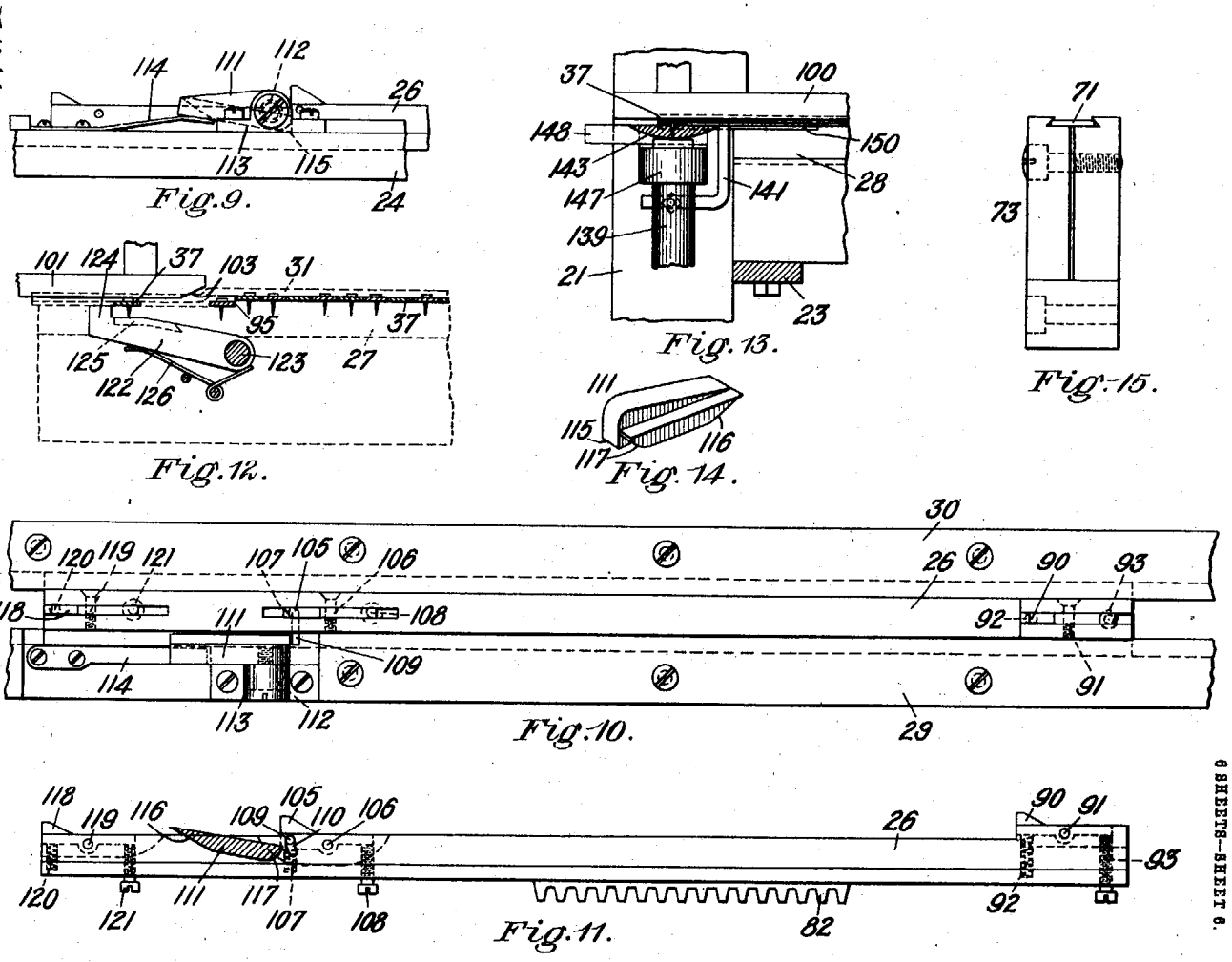
Witnesses:
Ernest A. Telfer
Lucius B. Weymouth
Inventor:
Bradford B. Waterman
by his attorney, Charles S. Gooding.
THE NORRIS PETERS CO., WASHINGTON, D. C.

UNITED STATES PATENT OFFICE.

BRADFORD B. WATERMAN, OF EAST BRIDGEWATER, MASSACHUSETTS, ASSIGNOR TO AMERICAN SHOE FINDING COMPANY, A CORPORATION OF MAINE.

MACHINE FOR TACKING SHOE-SHANKS.

No. 12,870. Specification of Reissued Letters Patent. Reissued Oct. 27, 1908.

Original No. 842,984, dated February 5, 1907, Serial No. 292,417. Application for reissue filed March 26, 1908. Serial No. 423,489.

*To all whom it may concern:*

Be it known that I, BRADFORD B. WATERMAN, a citizen of the United States, residing at East Bridgewater, in the county of Plymouth and State of Massachusetts, have invented new and useful Improvements in Machines for Tacking Shoe-Shanks, of which the following is a specification.

This invention relates to improvements in machines for tacking two pieces of sheet material together; and the object is to provide a machine by which tacks may be placed in perforations in a piece of sheet material and afterward force a second piece of sheet material against the tacks so placed, thereby tacking said pieces together.

The particularly illustrative embodiment of my invention here shown is adapted to tack metallic stiffeners provided with perforations at opposite ends thereof, respectively, to shoe-shanks formed of fibrous material.

The invention consists in the combination and arrangement of parts set forth in the following specification and particularly pointed out in the claims thereof.

Figure 4:
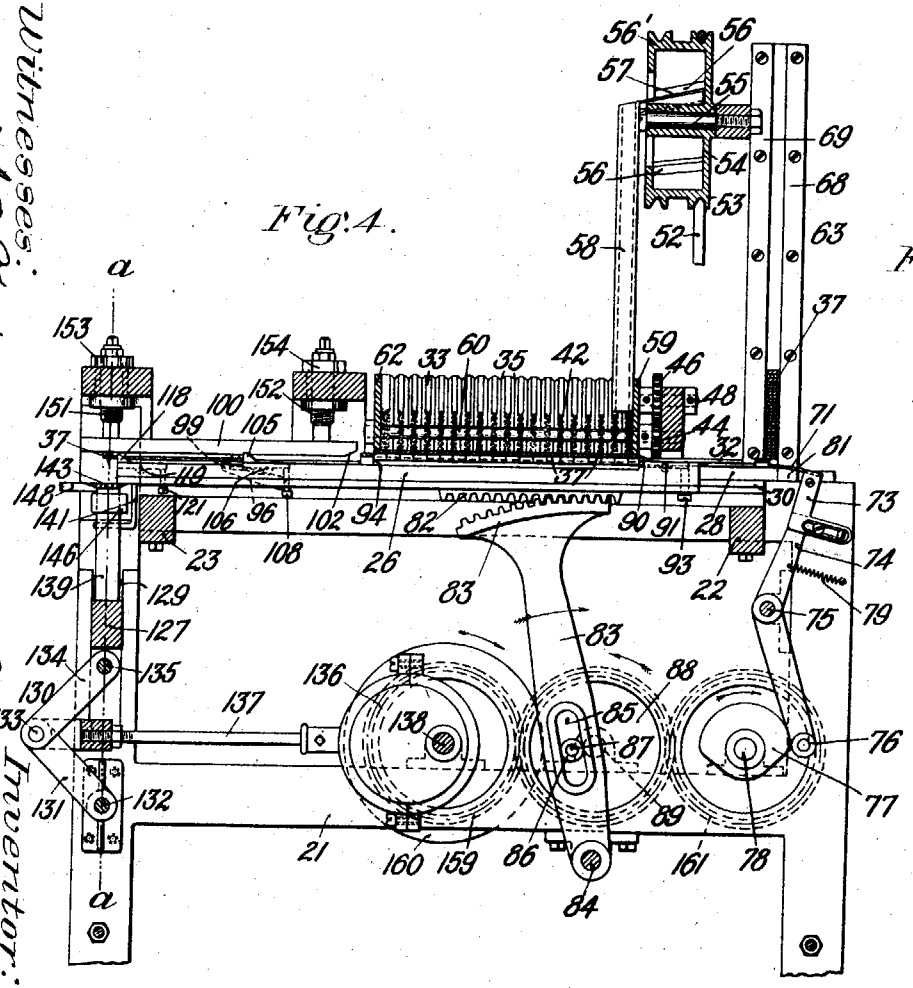
Figure 6:
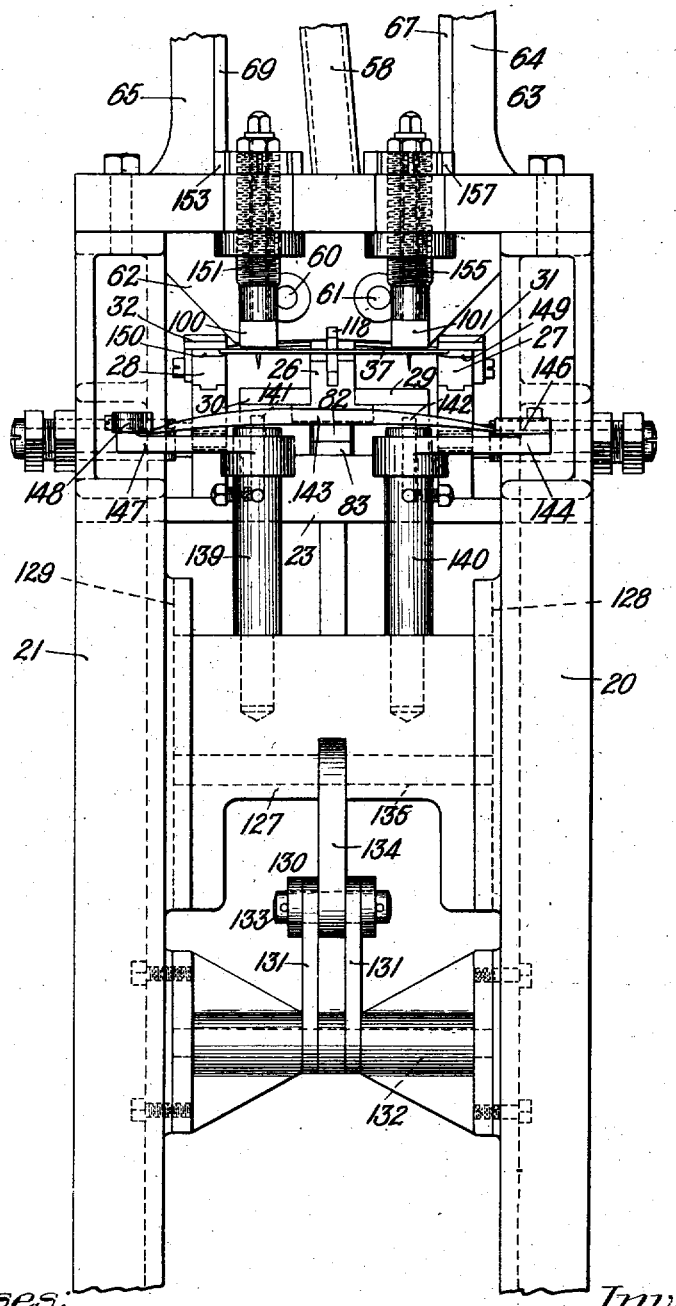
Figure 7:
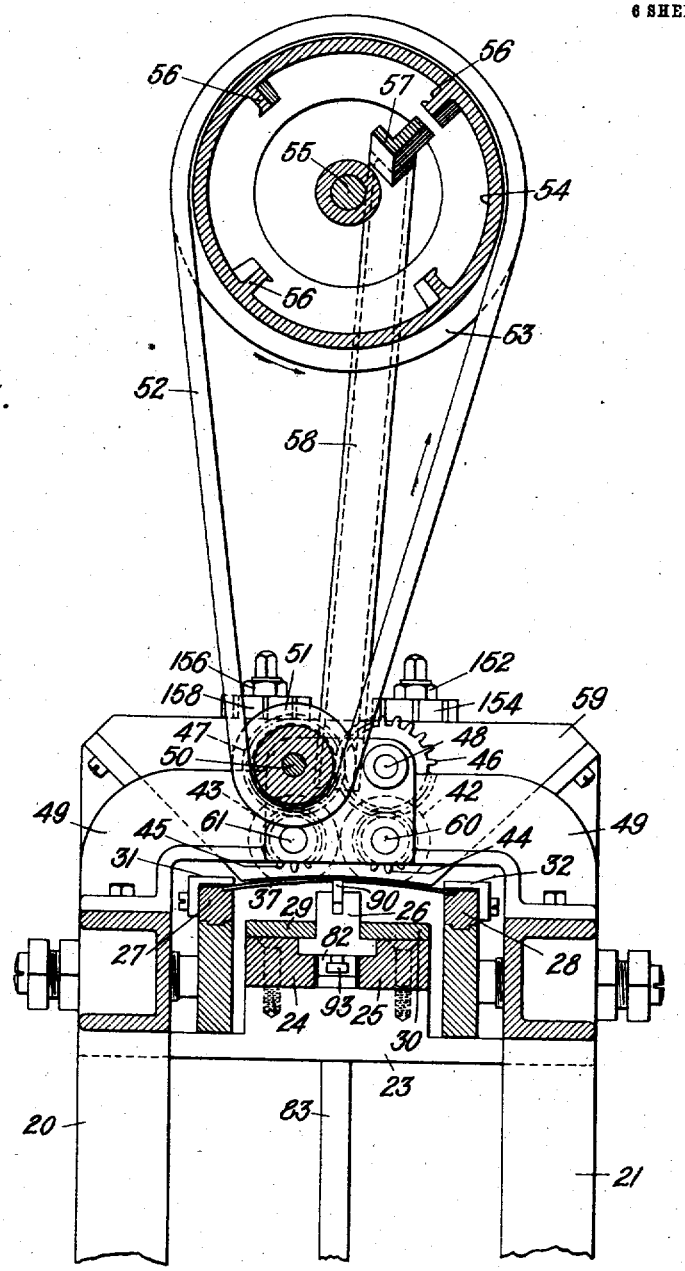
Figure 8:
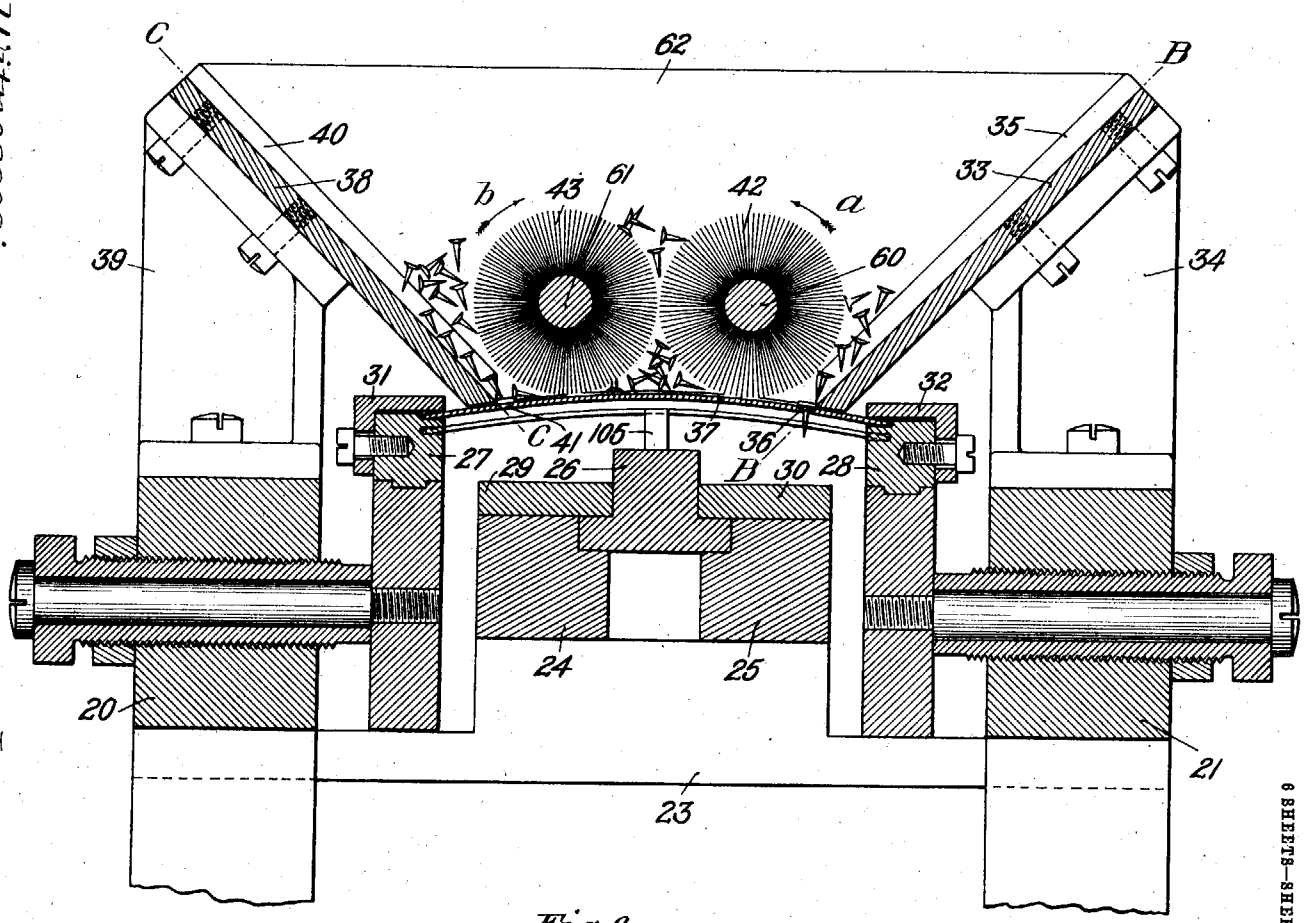

Referring to the drawings: Figure 1 is a plan view of my improved machine for tacking shoe-shanks. Fig. 2 is an enlarged detail plan section of the same, partly broken away to save space in the drawings. Fig. 3 is a detail section, partly in elevation, taken on line 3—3 of Fig. 2 looking in the direction of the arrow in said figure. Fig. 4 is a section, partly in elevation, taken on line 4—4 of Fig. 1 looking upwardly in said figure and partly broken away. Fig. 5 is an end elevation viewed from the right of Fig. 1. Fig. 6 is an enlarged end elevation viewed from the left of Fig. 1. Fig. 7 is an enlarged section, partly in elevation, taken on line 7—7 of Fig. 1 looking toward the left in said figure and partly broken away. Fig. 8 is an enlarged section, partly in elevation, taken on line 8—8 of Fig. 1 looking toward the left in said figure and partly broken away. Fig. 9 is an enlarged detail elevation of a portion of the feed-slide and the ways in which said slide is adapted to reciprocate. Fig. 10 is an enlarged detail plan of the feed-slide and the ways, said ways being partly broken away. Fig. 11 is an enlarged detail elevation of the feed-slide with a portion of the feed-pawl-operating latch shown therewith in section. Fig. 12 is a section, partly in elevation and partly broken away, taken on line 12—12 of Fig. 2 looking upwardly in said figure. Fig. 13 is a section, partly in elevation, on line 13—13 of Fig. 2 and partly broken away. Fig. 14 is a perspective view of the feed-pawl-operating latch. Fig. 15 is a side elevation of a block which holds one of the fingers.

Like numerals refer to like parts throughout the several views of the drawings.

In the drawings, 20 and 21 are side frames, which are tied together by brackets 22 and 23, upon which are mounted ways 24 and 25, said ways adapted to guide a reciprocatory feed-slide 26. The ways 27 and 28, adjustably secured to the side frames 20 and 21, respectively, are adapted to guide metallic stiffeners longitudinally of the feed-slide 26. The feed-slide 26 is held in place in the ways 24 and 25 by caps 29 and 30, fast to the ways 24 and 25, respectively. The metallic stiffeners are held in place in the ways 27 and 28 by caps 31 and 32, fast to the ways 27 and 28, respectively.

A raceway 33, mounted upon a bracket 34, is provided with preferably V-shaped grooves 35, the bottoms of which lie in a plane B—B, which intersects the perforations 36 of a row of metallic stiffeners 37, which extends throughout the length of the raceway 33. A raceway 38, mounted upon a bracket 39, is provided with grooves 40, identical with the grooves 35, the bottoms of said grooves 40 lying in a plane C—C which intersects the perforations 41 of the metallic stiffeners 37.

When tacks are thrown against the raceways 33 and 38 by means hereinafter described, the grooves 35 and 40, respectively, of said raceways guide said tacks downwardly, point foremost, into the perforations 36 and 41, respectively. Rotary brushes 42 and 43, rotated in the directions of the arrows *a* and *b*, respectively, in Fig. 8, are adapted to throw tacks deposited on the upper surfaces of the metallic stiffeners 37 against the raceways 33 and 38, the brushes 42 and 43 being driven by pinions 44 and 45, respectively, fast thereto. A gear 46, meshing into the pinion 44, meshes also with a gear 47, which meshes into the pinion 45. The gear 46 is mounted upon a shaft 48, mounted in a suitable bearing in a bracket 49. The gear 47 is fast to a shaft 50, mounted in a suitable bearing in the bracket 49, said shaft having a pulley 51 mounted thereon. The pulley 51 is driven by a round belt 52 from a pulley 53, said pulley 53 formed integral with a rotary tack-hopper 54, journaled on a stud 55. The hopper 54 is also provided with a pulley 56′ formed integral therewith and may be driven by a belt connected by any suitable source of power. The rotary tack-hopper 54, of well-known construction, is provided with buckets 56 on the interior periphery of said hopper, said buckets adapted to carry said tacks upwardly and deposit them upon a raceway 57, extending within said hopper. The raceway 57 is fast to a tube 58 and is adapted to guide the tacks into said tube. The tube 58 is rigidly fastened to an end plate 59, said tube being adapted to guide the tacks onto the brushes 42 and 43.

The shafts 60 and 61 of the brushes 42 and 43, respectively, are journaled to rotate at one pair of ends in suitable bearings in the bracket 49 and at the other pair of ends in suitable bearings in an end plate 62. As the metallic stiffeners 37 are fed along the ways 27 and 28 toward the left, Figs. 1, 2, and 4, the tacks deposited on the brushes 42 and 43 and delivered by said brushes to the upper surfaces of the metallic stiffeners 37 are carried along by said stiffeners and are thrown against the raceways 33 and 38.

The downwardly-converging raceways 33 and 38, the end plates 59 and 62, together with the row of stiffeners 37, extending from the end plate 59 to the end plate 62, constitute a receptacle adapted to hold tacks. Said receptacle might, if it were so desired, be provided with a bottom extending beneath said stiffeners and closely adjacent thereto.

A magazine 63 is adapted to contain metallic stiffeners in a substantially vertical column therein, said magazine 63 comprising in its construction two vertical brackets 64 and 65, mounted upon the side frames 20 and 21, respectively. The bracket 64 is provided with guides 66 and 67, and the bracket 65 is provided with guides 68 and 69, all of said guides acting to guide the stiffeners therein.

Referring to Fig. 4, the ways 27 and 28, at the right-hand ends thereof, extend beneath the column of stiffeners in the magazine 63, so that the lowermost stiffener of said column rests upon said ways.

Fingers 70 and 71 are adjustably mounted in blocks 72 and 73, respectively. The blocks 72 and 73 are adjustably secured to a lever 74, said lever fast to a rock-shaft 75, provided with suitable bearings in the side frames 20 and 21. At the lower extremity of the lever 74 is a cam-roll 76, journaled to rotate thereon and adapted to engage a cam 77, fast to a shaft 78, said shaft 78 journaled to rotate in bearings on the side frames 20 and 21. The cam 77 is adapted to impart a rocking motion to the lever 74, upon which the fingers 70 and 71 are carried, and a helical extension-spring 79 is adapted to hold the cam-roll 76 in engagement with the cam 77. The fingers 70 and 71 are guided by guide-blocks 80 and 81, respectively, and are adapted to engage the lowermost stiffener of the column of stiffeners in the magazine 63 and push said stiffener a portion of its width transversely of said column.

The feed-slide 26 is provided on the under side thereof with a rack 82, which meshes into a gear-sector 83. The gear sector 83 is mounted upon a rock-shaft 84, provided with suitable bearings in the side frames 20 and 21, and said gear-sector is provided with a slot 85, adapted to engage a roll 86, said roll journaled on a crank pin 87. The crank pin 87 is fast to a gear 88, said gear being fast to a shaft 89, said shaft 89 being journaled in a suitable bearing on the side frame 21. When the gear 88 is rotated by mechanism hereinafter described, the pin 87, with the roll 86, mounted thereon, is adapted to impart an oscillatory movement to the gear-sector 83, said gear-sector in turn imparting a reciprocatory movement to the feed-slide 26.

Referring more particularly to Figs. 10 and 11, a feed-pawl 90 is pivoted at 91 to the feed-slide 26, and the left-hand end thereof is normally pressed upwardly by a helical compression spring 92. An adjustable stop-screw 93 is adapted to limit the upward movement of the left-hand end of the feed-pawl 90. When the feed-slide 26 is moved to the right from the position shown in Fig. 4, by mechanism hereinbefore described, the feed-pawl 90 passes beneath the lowermost stiffener, which has been previously fed a portion of its width transversely of said column of stiffeners, as hereinbefore described. The feed-pawl 90, in passing beneath the lowermost stiffener, is pressed downwardly against the action of the spring 92, and when said feed-pawl has passed beyond the right-hand edge of said lowermost stiffener said feed-pawl is pressed upwardly against the under side of the stiffener which is immediately adjacent to said lowermost stiffener, the fingers 70 and 71 remaining against said lowermost stiffener during the passage of the feed-pawl 90 beneath said stiffener and preventing said stiffener from being moved to the right during the passage of said feed-pawl beneath said stiffener. When the feed-slide 26 is moved to the left to the position shown in Fig. 4, the feed-pawl 90 carries the lowermost stiffener along the ways 27 and 28 to a position beneath the end plate 59, thus pushing the whole row of stiffeners to the left a distance equal to the width of one of said stiffeners. When this takes place, the stiffener at the extreme left-hand end of the row passes over shoulders 94 and 95, formed on the ways 28 and 27, respectively, and drops down with its right-hand edge immediately adjacent to said shoulders.

An ejector-arm 96, pivoted at 97, is normally pressed upwardly by a spring 98, and when in its normal position an upwardly-extending finger 99, formed integral with said ejector-arm, lies in the path of movement of stiffeners as they are fed along from right to left of the ways 28. As the stiffeners are fed by means hereinafter described, toward the left from the shoulder 94, they pass beneath two elongated anvils 100 and 101. The anvil 100 is provided at its right-hand end with an incline 102, and the anvil 101 is provided at its right-hand end with an incline 103. The ends of the stiffeners are securely held against vertical movement by the ways 27 and 28 and their respective caps 31 and 32. The anvils 100 and 101 are so adjusted vertically that as the stiffeners pass beneath the inclines 102 and 103 said stiffeners are flattened out as they pass down said inclines. The anvils 100 and 101 are so adjusted longitudinally of the stiffeners that the anvil 100 covers the perforations 36 and the anvil 101 covers the perforations 41 as the stiffeners are fed along the ways 27 and 28.

As each stiffener is fed to the left from the shoulder 94 if a tack is located in the perforation 36 of said stiffener the point of said tack will engage an inclined projection 104, formed integral with the ejector-arm 96, and will press said ejector-arm downwardly against the action of the spring 98, thereby moving the finger 99 out of the path of said stiffener. If, however, the perforation 36 should contain no tack, the ejector-finger 99 will remain in the path of said stiffener.

The feed-slide 26 is provided with a feed-pawl 105, pivoted at 106 and held normally in the position shown in Fig. 11 by a helical compression - spring 107. An adjustable stop-screw 108 is adapted to limit the upward movement of the left-hand end of the feed-pawl 105. The feed-pawl 105 is provided with a pin 109, fast thereto and extending through a slot 110 in the feed-slide 26.

A latch 111 is pivoted at 112 to a bracket 113, said bracket being fast to the way 24. The latch 111 is normally held in the position shown in Fig. 9 by a spring 114, and a stop 115, formed integral with said latch, is adapted to limit the upward movement of said latch. As the feed-slide 26 is moved to the left the feed-pawl 105 carries the stiffener, the right-hand edge of which is adjacent to the shoulder 94, toward the left, at which time the pin 109, fast to said feed-pawl, passes over the top of the latch 111, pressing said latch 111 downwardly against the action of the spring 114 and leaving said stiffener a distance from said shoulder 94 equal to the travel of said feed-slide. Upon the next movement of the feed-slide 26 to the right the pin 109 strikes an incline 116, formed on the under side of the latch 111, and passes beneath and beyond said latch and is returned to its normal position after passing the rounded end 117 of the latch 111, at which time said feed-pawl is in the proper position to engage another stiffener which has been dropped with its right-hand edge adjacent to the shoulders 94 and 95.

The feed-slide 26 is also provided with a feed-pawl 118, pivoted at 119 to said feed-slide and normally held in the position shown in Fig. 11 by a helical compression spring 120. An adjustable stop-screw 121 is adapted to limit the upward movement of the feed-pawl 118. When the feed-slide is moved to the extreme right-hand limit of its movement, the feed-pawl 118 engages the stiffener previously fed to the left from the shoulder 94 by the pawl 105, as hereinbefore described, and moves said stiffener along the ways 27 and 28 until the tacks located in the perforations of said stiffener lie in a plane *a—a*, Figs. 1 and 4. Should one of the stiffeners have failed to receive a tack in its perforation 36, the ejector-finger 99 will remain in the path of one end of said stiffener, and when the feed-pawl 118 engages said stiffener to move it toward the left the other end of said stiffener will be swung on an arc *x* and thus both ends of said stiffener will be freed from their respective ways, and said stiffener will drop out of the machine.

An ejector-arm 122, similar in construction to the ejector-arm 96, is pivoted at 123 and has formed integral therewith an upwardly-turned ejector-finger 124 and an inclined projection 125. The ejector-arm 122 is normally held in the position shown in Fig. 12 by a spring 126. When a stiffener has failed to receive a tack in its perforation 41, the ejector-finger 124 engages one end of said stiffener, and when said stiffener is carried to the left by the feed-pawl 105 the other end of said stiffener will be swung on an arc *y* and said stiffener will be ejected from the machine in a manner similar to the ejection of the stiffener hereinbefore described.

It will be noted that the ejector arms 96 and 122 are located out of alinement with each other longitudinally of the ways 27 and 28. It will be understood that if the ejector-fingers were arranged in alinement with each other longitudinally of the ways 27 and 28 a stiffener having no tack in either of its perforations would strike both of said fingers simultaneously and continued movement of the feed pawl toward the left would result either in the breaking of the stiffener or the breaking of some part of the mechanism.

Referring now to Figs. 2, 4, and 6, 127 is a slide adapted to reciprocate in ways 128 and 129, formed in the side frames 20 and 21, respectively. A reciprocatory movement is imparted to the slide 127 by a toggle 130, consisting of links 131, 131, connected at their lower ends to a pivotal pin 132 and at their upper ends to a pivotal pin 133, and a link 134, connected at its lower end to the pivotal pin 133 and at its upper end to a pivotal pin 135. The toggle 130 is operated by an eccentric 136, connected to said toggle by an eccentric-rod 137. The eccentric 136 is fast to a shaft 138, provided with suitable bearings in the side frames 20 and 21 and rotated by means hereinafter described. The slide 127 is provided with drivers 139 and 140, extending upwardly therefrom. The driver 139 is provided with an L-shaped adjustable stop 141 and the driver 140 is provided with a similar stop 142, said stops being adapted to locate a leather-board shoe-shank 143. (Shown in dotted lines in Fig. 2 and in full lines in Fig. 6.) The driver 140 is also provided with a bracket 144, upon which is mounted an adjustable stop 145, provided with a serrated edge 146. The driver 139 is provided with a bracket 147, upon which is mounted a spring 148, said spring adapted to hold the shoe-shank 143 against the serrated edge 146 of the stop 145.

Referring to Figs. 6 and 13, the left-hand extremities 149 and 150 of the ways 27 and 28, respectively, are of very thin vertical section, and the portions of said extremities which intervene between the metallic stiffener and the shoe-shank located on the drivers 139 and 140 are not thick enough to interfere with the operation of tacking said two pieces together.

The anvil 100 may be adjusted vertically by means of adjusting screws 151 and 152, said adjusting screws being locked, after being adjusted, by lock-nuts 153 and 154, respectively. The anvil 101 may be adjusted vertically by means of adjusting screws 155 and 156 and after being adjusted locked by lock-nuts 157 and 158.

Fast to the shaft 138 is a gear 159, which meshes into the gear 88. A pulley 160, also fast to the shaft 138 and driven by a belt, (not shown) is adapted to rotate said shaft. Fast to the shaft 78 is a gear 161, which meshes into said gear 88.

The operation of my improved tacking machine is as follows: The operator places a shoe-shank, formed of leather-board or other fibrous material, on the drivers 139 and 140 in the position shown in full lines, Fig. 6, and in dotted lines in Fig. 2. A metallic stiffener, with a tack in each of its perforations, is fed to a position above said shoe-shank, as hereinbefore described. The feed-slide 26 is withdrawn from the path of the drivers 139 and 140 and the slide 127 moves upwardly, as hereinbefore described. The shoe-shank 143 is thus forced against the tacks in the perforations and against the stiffener, said tacks being driven entirely through said shoe-shank and clenched against the drivers 139 and 140. When the slide 127 has returned to the position shown in Fig. 6, the operator removes the finished article from the drivers 139 and 140.

Having thus described my invention, what I claim, and desire by Letters Patent to secure is:

1. In a machine for placing tacks in perforations in sheet material, a raceway provided with a plurality of grooves the bottoms of which lie in a plane intersecting said perforations, whereby tacks located in said raceway are adapted to be guided directly into said perforations, means for guiding said sheet material transversely of said grooves, whereby said perforations are maintained in alinement with said plane, and means for feeding said sheet material transversely of said grooves.

2. In a machine for placing tacks in perforations in sheet material, a raceway provided with a plurality of grooves, the bottoms of which lie in a plane which intersects said perforations, whereby tacks located in said raceway are adapted to be guided directly into said perforations, means for feeding tacks to said grooves, means for guiding said sheet material transversely of said grooves, whereby said perforations are maintained in alinement with said plane, and means for feeding said sheet material transversely of said grooves.

3. In a machine for placing tacks in perforations in sheet material, a raceway provided with a plurality of grooves, the bottoms of which lie in a plane which intersects said perforations, whereby tacks located in said raceway are adapted to be guided directly into said perforations, a rotary brush adapted to throw said tacks against said raceway, means for guiding said sheet material transversely of said grooves, whereby said perforations are maintained in alinement with said plane, and means for feeding said sheet material transversely of said grooves.

4. In a machine for placing tacks in perforations in sheet material, a raceway provided with a plurality of grooves, the bottoms of which lie in a plane which intersects said perforations, whereby tacks located in said raceway are adapted to be guided directly into said perforations, means for feeding tacks onto the upper surface of said sheet material, means for throwing said tacks from said surface against said raceway, means for guiding said material transversely of said grooves, whereby said perforations are maintained in alinement with said plane, and means for feeding said sheet material transversely of said grooves.

5. In a machine for tacking pieces of sheet material provided with perforations to non perforated pieces of sheet material, a raceway provided with a plurality of grooves, the bottoms of which lie in a plane which intersects said perforations, whereby tacks located in said raceway are adapted to be guided directly into said perforations, means for feeding tacks to said grooves, means for guiding said perforated pieces transversely of said grooves, whereby said perforations are maintained in alinement with said plane, means for feeding said perforated pieces in a continuous row transversely of said grooves, means for separating said perforated pieces from said row one at a time, and mechanism for tacking one of said perforated pieces to one of said non-perforated pieces.

6. In a machine for tacking pieces of sheet material provided with perforations to non-perforated pieces of sheet material, a raceway provided with a plurality of grooves, the bottoms of which lie in a plane which intersects said perforations, whereby said tacks are guided directly into said perforations, means for feeding tacks to said grooves, means for guiding said perforated pieces transversely of said grooves, whereby said perforations are maintained in alinement with said plane, means for feeding said perforated pieces transversely of said grooves, and mechanism for tacking one of said perforated pieces to one of said non-perforated pieces.

7. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, a tack-hopper, a second raceway adapted to feed tacks from said hopper onto the upper surfaces of said perforated pieces, means for throwing said tacks from said upper surfaces against said first-named raceway, means for guiding said perforated pieces transversely of said grooves, whereby said perforations are maintained in alinement with said plane, means for feeding said perforated pieces transversely of said grooves, and mechanism for tacking one of said perforated pieces to one of said non-perforated pieces.

8. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, a magazine adapted to contain said perforated pieces, means for feeding said perforated pieces out of said magazine, means for guiding said perforated pieces transversely of said grooves, whereby said perforations are maintained in alinement with said plane, means for feeding said perforated pieces transversely of said grooves, and mechanism for tacking one of said perforated pieces to one of said non-perforated pieces.

9. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, a magazine adapted to contain said perforated pieces, means for feeding said perforated pieces out of said magazine, means for guiding said perforated pieces transversely of said grooves, means for feeding said perforated pieces transversely of said grooves, means for feeding tacks to said grooves, an inverted anvil beneath which said perforated pieces are fed, a driver adapted to force one of said non-perforated pieces against one of said perforated pieces with tacks in said perforations, and mechanism for operating said driver.

10. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, means for feeding tacks to said grooves, means for guiding said perforated pieces transversely of said grooves, whereby said perforations are maintained in alinement with said plane, means for feeding said perforated pieces transversely of said grooves, mechanism for tacking one of said perforated pieces to one of said non-perforated pieces, and ejecting means located between said raceway and said tacking mechanism for ejecting each of said perforated pieces that has failed to receive a tack in each of said perforations.

11. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, a magazine adapted to contain said perforated pieces, means for feeding said perforated pieces out of said magazine, means for guiding said perforated pieces transversely of said grooves, whereby said perforations are maintained in alinement with said plane, means for feeding said perforated pieces transversely of said grooves, means for feeding tacks to said grooves, an inverted anvil beneath which said perforated pieces are fed, a driver adapted to force one of said non-perforated pieces against one of said perforated pieces with tacks in said perforations, mechanism for operating said driver, and ejecting means located between said raceway and said anvil for ejecting each of said non-perforated pieces that has failed to receive a tack in each of its perforations.

12. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, means for feeding tacks to said grooves, means for guiding said perforated pieces transversely of said grooves, whereby said perforations are maintained in alinement with said plane, a reciprocatory slide adapted to feed a row of said perforated pieces transversely of said grooves, and means for tacking one of said perforated pieces to one of said non-perforated pieces.

13. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, means for feeding tacks to said grooves, means for guiding said perforated pieces transversely of said grooves, whereby said perforations are maintained in alinement with said plane, means for feeding a row of said perforated pieces transversely of said grooves, means for separating said perforated pieces from said row, one at a time, an ejecting finger normally lying in the path of said perforated pieces and adapted to be moved from said path by a tack located in one of said perforations, said ejecting finger coöperating with said separating means to eject each of said perforated pieces that has failed to receive a tack in one of said perforations.

14. In a machine for fastening two pieces of material together by means of a tack or the like, means for introducing a tack into one of said pieces, mechanism adapted to drive said tack into the second of said pieces, means for feeding said first piece toward said driving mechanism, and an ejecting finger normally lying in the path of said first piece and adapted to be moved from said path by a tack located in said first piece, said feeding means being adapted to coöperate with said ejecting finger to eject said first piece should the same fail to receive a tack.

15. In a machine for fastening two pieces of material together by means of a tack or the like, means for introducing a tack into one of said pieces, mechanism adapted to drive said tack into the second of said pieces, a carrier adapted to engage and move said first piece toward said driving mechanism, and an ejecting finger normally lying in the path of said first piece and adapted to be moved from said path by a tack located in said first piece, said carrier being adapted to coöperate with said ejecting finger to eject said first piece should the same fail to receive a tack.

16. In a machine for tacking metallic stiffeners each provided with perforations at opposite ends thereof, respectively, to shoe-shanks, a receptacle having two opposite downwardly converging sides, each provided with a plurality of grooves adapted to guide tacks directly into said perforations at opposite ends, respectively, of said stiffeners, means for feeding tacks to said grooves, means for guiding said stiffeners transversely of said grooves, means for feeding said stiffeners transversely of said grooves, and mechanism for tacking one of said stiffeners to one of said shoe-shanks.

17. In a machine for tacking metallic stiffeners, each provided with perforations at opposite ends thereof, respectively, to fibrous shoe-shanks, two opposite downwardly converging multigrooved raceways adapted to guide tacks into said perforations at opposite ends, respectively, of said stiffeners, means for feeding said stiffeners in a continuous row transversely of said grooves, means for separating said stiffeners from said row, one at a time, and mechanism for tacking one of said stiffeners to one of said shoe-shanks.

18. In a machine for tacking metallic stiffeners, each provided with perforations at opposite ends thereof, respectively, to fibrous shoe-shanks, two opposite downwardly converging multigrooved raceways adapted to guide tacks into said perforations at opposite ends, respectively, of said stiffeners, means for feeding tacks onto the upper surfaces of said stiffeners, means for throwing said tacks from said upper surfaces against said raceways, means for feeding said stiffeners transversely of said grooves, and mechanism for tacking one of said stiffeners to one of said shoe-shanks.

19. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, means for feeding tacks to said grooves, a magazine adapted to contain stiffeners, means for feeding said stiffeners out of said magazine, means for guiding said stiffeners transversely of said grooves, means for feeding said stiffeners transversely of said grooves, and mechanism for tacking one of said stiffeners to one of said shoe-shanks.

20. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, means for feeding tacks to said grooves, ways adapted to guide said stiffeners transversely of said grooves, means for feeding said stiffeners along said ways, and mechanism for tacking one of said stiffeners to one of said shoe-shanks.

21. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, means for feeding tacks to said grooves, a magazine adapted to contain said stiffeners in a substantially vertical column, a pair of fingers adapted to engage the lowermost stiffener of said column and push it a portion of its width transversely of said column, a pivoted arm upon which said fingers are mounted, mechanism adapted to impart an oscillatory movement to said arm, ways adapted to guide said stiffeners transversely of said grooves, a feed-slide adapted to feed said stiffeners longitudinally of said ways, mechanism to impart a reciprocatory movement to said feed-slide, and mechanism for tacking one of said stiffeners to one of said shoe-shanks.

22. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, means for feeding tacks to said grooves, a magazine adapted to contain said stiffeners in a substantially vertical column, a pair of fingers adapted to engage the lowermost stiffener of said column and push it a portion of its width transversely of said column, a pivoted arm upon which said fingers are mounted, mechanism to impart an oscillatory movement to said arm, ways adapted to guide said stiffeners transversely of said grooves, a feed-slide adapted to feed said stiffeners longitudinally of said ways, mechanism to impart a reciprocatory movement to said feed-slide, an inverted anvil beneath which said stiffeners are fed, and a reciprocatory driver adapted to force a shoe-shank placed thereon against said stiffener.

23. In a machine for tacking metallic stiffeners, each provided with perforations at opposite ends thereof, respectively, to fibrous shoe-shanks, two opposite downwardly converging multigrooved raceways adapted to guide tacks into said perforations at opposite ends, respectively, of said stiffeners, means for feeding tacks to said grooves, a magazine adapted to contain said stiffeners in a substantially vertical column, a pair of fingers adapted to engage the lowermost stiffener of said column and push it a portion of its width transversely of said column, a pivoted arm upon which said fingers are mounted, mechanism to impart an oscillatory movement to said arm, two guide-blocks adapted to guide said fingers, respectively, ways adapted to guide said stiffeners transversely of said grooves, a feed-slide adapted to feed said stiffeners longitudinally of said ways, mechanism to impart a reciprocatory movement to said feed-slide, and mechanism for tacking one of said stiffeners to one of said shoe-shanks.

24. In a machine for tacking metallic stiffeners, each provided with perforations at opposite ends thereof, respectively, to fibrous shoe-shanks, two opposite downwardly converging multigrooved raceways adapted to guide tacks into said perforations at opposite ends, respectively, of said stiffeners, means for feeding tacks to said grooves, a magazine adapted to contain said stiffeners in a substantially vertical column, a pair of fingers adapted to engage the lowermost stiffener of said column and push it a portion of its width transversely of said column, a pivoted arm upon which said fingers are adjustably mounted, mechanism to impart an oscillatory movement to said arm, two guide-blocks adapted to guide said fingers, respectively, ways adapted to guide said stiffeners transversely of said grooves, a feed-slide adapted to feed said stiffeners longitudinally of said ways, mechanism to impart a reciprocatory movement to said feed-slide, and mechanism for tacking one of said stiffeners to one of said shoe-shanks.

25. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, means for feeding tacks to said grooves, a magazine adapted to contain said stiffeners in a substantially vertical column, a pair of fingers adapted to engage the lowermost stiffener of said column and push it a portion of its width transversely of said column, a pivoted arm upon which said fingers are mounted, mechanism to impart an oscillatory movement to said arm, ways adapted to guide said stiffeners transversely of said grooves, a feed-slide adapted to feed said stiffeners longitudinally of said ways, mechanism to impart a reciprocatory movement to said feed-slide, a vertically-adjustable anvil beneath which said stiffeners are fed, and a reciprocatory driver adapted to force a shoe-shank placed thereon against said stiffener.

26. In a machine for tacking metallic stiffeners, each provided with perforations at opposite ends thereof, respectively, to fibrous shoe-shanks, two opposite downwardly converging multigrooved raceways adapted to guide tacks into said perforations at opposite ends, respectively, of said stiffeners, means for feeding a row of stiffeners transversely of said grooves, means for separating said stiffeners from said row one at a time, a reciprocatory driver adapted to drive one of said shoe-shanks upwardly against said stiffener with tacks in said perforations, a set of stops against which said shoe-shank may be located, and a spring acting to hold said shoe-shank against one of said stops.

27. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, means for feeding tacks to said grooves, a magazine adapted to contain said perforated pieces, means for feeding said perforated pieces from said magazine, ways adapted to guide said perforated pieces transversely of said grooves, whereby said perforations are maintained in alinement with said plane, a feed-slide, a feed-pawl pivoted to said feed-slide adapted to engage one of said perforated pieces, mechanism for imparting a reciprocatory movement to said feed-slide, and mechanism for tacking one of said perforated pieces to one of said non-perforated pieces.

28. In a machine for tacking pieces of sheet material provided with perforations to non-perforated pieces of sheet material, a raceway provided with a plurality of grooves, the bottoms of which lie in a plane which intersects said perforations, whereby tacks located in said raceway are adapted to be guided directly into said perforations, means for feeding tacks to said grooves, a magazine adapted to contain said perforated pieces, means for feeding said perforated pieces from said magazine, ways adapted to guide said perforated pieces transversely of said grooves, whereby said perforations are maintained in alinement with said plane, a feed-slide, a plurality of feed-pawls pivoted to said feed-slide adapted to engage respective perforated pieces, mechanism for imparting a reciprocatory movement to said feed-slide, and mechanism for tacking one of said perforated pieces to one of said non-perforated pieces.

29. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners.

30. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, and means for feeding tacks to said grooves.

31. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, and means for feeding said stiffeners transversely of said grooves.

32. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, means for guiding said stiffeners transversely of said grooves, and means for feeding said stiffeners transversely of said grooves.

33. In a machine for tacking metallic stiffeners each provided with perforations at opposite ends thereof, respectively, to shoe-shanks, a receptacle having two opposite downwardly converging sides each provided with a plurality of grooves adapted to guide tacks directly into said perforations at opposite ends, respectively, of said stiffeners, means for guiding said stiffeners transversely of said grooves, and mechanism for tacking one of said stiffeners to one of said shoe-shanks.

34. In a machine for fastening two pieces of material together by means of tacks or the like, means for introducing two tacks into one of said pieces, mechanism adapted to drive said tacks into the second of said pieces, a carrier adapted to move said first piece toward said driving mechanism, and two ejecting fingers normally located in the path of said first piece and adapted to be independently moved therefrom by two tacks located in said first piece, said carrier being adapted to coöperate with one of said fingers to eject said first piece should the same fail to receive one of said tacks in either one of its perforations.

35. In a machine for fastening two pieces of material together by means of a tack or the like, means for introducing a tack into one of said pieces, mechanism adapted to drive said tack into the second of said pieces, ways adapted to guide said first piece, a carrier adapted to move said first piece along said ways toward said driving mechanism, and an ejecting finger normally lying in the path of said first piece and adapted to be moved from said path by a tack located in said first piece, said carrier being adapted to coöperate with said ejecting finger to move said first piece out of engagement with said ways should said first piece fail to receive a tack.

36. In a machine for fastening two pieces of material together by means of a tack or the like, means for introducing a tack into one of said pieces, mechanism adapted to drive said tack into the second of said pieces, a carrier adapted to move said first piece toward said driving mechanism, and an ejecting finger normally lying in the path of said first piece and adapted to be moved from said path by a tack located in said first piece, said carrier being adapted to engage said first piece between one end thereof and said finger and being adapted to coöperate with said finger to eject said first piece should the same fail to receive a tack.

37. In a machine for fastening two pieces of material together by means of a tack or the like, means for introducing a tack into one of said pieces, mechanism adapted to drive said tack into the second of said pieces, ways adapted to guide said first piece, a carrier adapted to move said first piece along said ways toward said driving mechanism, and an ejecting finger normally lying in the path of said first piece and adapted to be moved from said path by a tack located in said first piece, said carrier being adapted to rock said first piece on said finger as a fulcrum out of engagement with said ways should said first piece fail to receive a tack.

38. In a machine for fastening two pieces of material together by means of tacks or the like, means for introducing two tacks into one of said pieces, mechanism adapted to drive said tacks into the second of said pieces, ways adapted to guide said first piece, a carrier adapted to move said first piece along said ways toward said driving mechanism, and two ejecting fingers normally lying in the path of said first piece and adapted to be independently moved from said path by two tacks located in said first piece, said carrier being adapted to rock said first piece on one of said fingers as a fulcrum out of engagement with said ways should said first piece fail to receive one of said tacks in either one of its perforations.

39. In a machine for fastening two pieces of material together by means of a tack or the like, means for introducing a tack into one of said pieces, mechanism adapted to drive said tack into the second of said pieces, means for feeding said first piece toward said driving mechanism, and a movable stop, a part of which normally lies in the path of said first piece, said stop adapted to be engaged by a tack located in said first piece and moved thereby out of said path, said feeding means being adapted to coöperate with said stop to eject said first piece should the same fail to receive a tack.

40. In a machine for fastening two pieces of material together by means of a tack or the like, means for introducing a tack into one of said pieces, mechanism adapted to drive said tack into the second of said pieces, means for feeding said first piece toward said driving mechanism, and a movable stop which normally lies in the path of said first piece, said stop being adapted to be moved from said path by a tack located in said first piece, said feeding means adapted to coöperate with said stop to eject said first piece should the same fail to receive a tack.

In testimony whereof I have hereunto set my hand in presence of two subscribing witnesses.

BRADFORD B. WATERMAN.

Witnesses:
NINETTA M. WATERS,
LOUISE T. COLE.